Patented May 4, 1926.

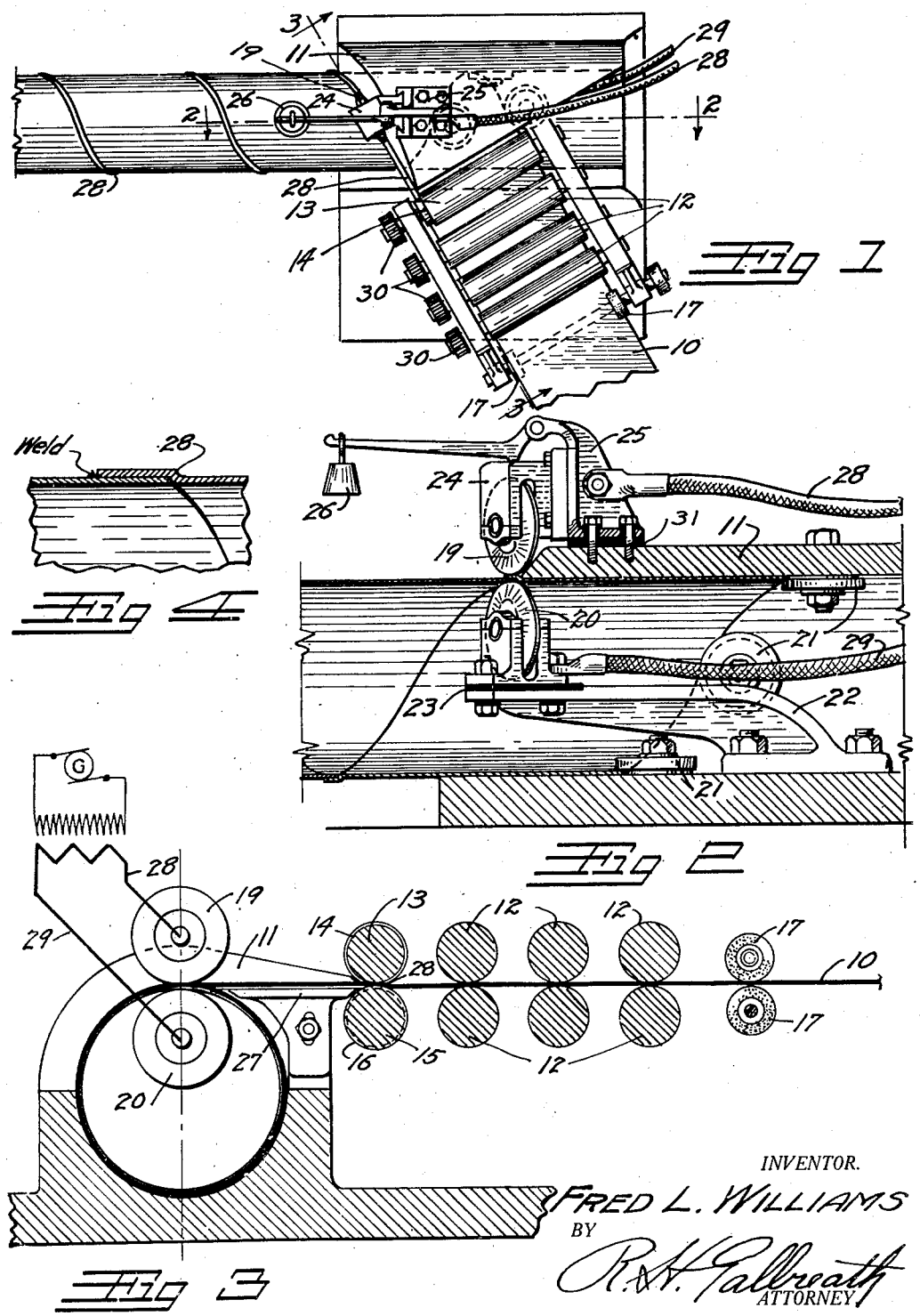

1,583,212

UNITED STATES PATENT OFFICE.

FREDERICK L. WILLIAMS, OF DENVER, COLORADO.

LAP-WELDED PIPE.

Application filed February 7, 1924. Serial No. 691,158.

*To all whom it may concern:*

Be it known that I, FREDERICK L. WILLIAMS, a citizen of the United States of America, residing at Denver, in the county of Denver and State of Colorado, have invented certain new and useful Improvements in Lap-Welded Pipes, of which the following is a specification.

This invention relates to pipe formed by wrapping a strip of sheet metal in the form of a closed spiral and has for its principal object the provision of a pipe of this character in which the abutting edges of the spiral will be lapped and electrically welded together.

The applicant is aware that pipe has been formed by wrapping a sheet of metal in a spiral with overlapped edges and with the edges welded together. This pipe, however, was formed by a gas welding apparatus or blow pipe and was never a commercial success owing to the impossibility of obtaining a perfect weld.

In the present invention the pipe is formed by welding the overlapping edges through the medium of heat generated by the electrical resistance of the contacting edges.

Other objects and advantages reside in the improved pipe and in the process of making the same, which result in simplicity, economy, and efficiency, and which will become more apparent from the following description.

While a specific form of the improvement and process is described and illustrated herein, it is desired and understood that the same may be varied, within the scope of the appended claims, without departing from the spirit of the invention.

In the following detailed description of the invention reference is had to the accompanying drawing which forms a part hereof. Like numerals refer to like parts in all views of the drawing and throughout the description.

In the drawing:

Fig. 1 is a plan view of a device for forming the improved pipe;

Fig. 2 is a longitudinal section taken on the line 2—2 Fig. 1;

Fig. 3 is a diagrammatic section taken on the line 3—3 Fig. 1;

Fig. 4 is a detail view showing an enlarged cross-section through the contacting edges of the spiral.

The preferred method of forming my improved pipe is by forcing a strip, 10, of sheet metal into a former, 11, by means of a series of rollers, 12. One of the rollers, 13, is grooved at its one extremity as shown at 14, and the roller which coacts with the roller 13, designated by the numeral 15, carries a bead, 16, which upsets the edge of the metal strip, as indicated at 28, so that it will overlap the edge of the adjacent turn leaving the interior surface of the pipe flush, as shown in Fig. 4.

Grinding wheels 17 are provided to remove the scale from the edges of the oncoming strip so that a perfect weld will be formed.

As the strip passes into the former and overlaps the strip passing out of the former, the lap passes between two rotary electrodes 19 and 20. A current of electricity of high amperage is conducted to the electrodes, by means of suitable conductors 28 and 29, and passes between the electrodes 19 and 20 thereby heating the contacting faces of the over-lapping edges of the spiral to welding heat, and fusing the metal into one continuous piece.

In the apparatus shown on the drawing, rollers 21 are placed on the interior of the former 10 to force the strip into a spiral of the proper pitch.

The electrode wheel 20 is supported on the interior of the pipe on an arm 22 from which it is insulated by means of suitable insulation 23. The electrode wheel 19 is supported upon the former 10 in a bracket 24 which is vertically slidable on a standard 25 secured on, and insulated from, the former 10. A weight 26 is used to hold the electrode wheel 19 in constant engagement with the pipe.

It will be noted that in this process no mandrel is used, the pipe being formed by an exterior former. The former extends forward to close proximity with the rollers 13 and 15, and is provided with an adjustable plate 27 which prevents the strip 10 from buckling under the pressure of the rollers. The rollers may be driven by any suitable gearing 30.

The upset 28 projects from the exterior of the pipe and forms a spiral bead around the pipe which adds greatly to the strength thereof. The interior surface is left even and smooth.

While a specific apparatus has been described herein for carrying out my process I wish it understood that this apparatus is simply illustrative and may be altered if desired without injuring the process or departing from the spirit of the invention.

Having thus described the invention what I claim and desire secured by Letters Patent is:—

1. An apparatus for making sheet metal pipe comprising a stationary cylinder; rollers positioned at an angle to the axis of said cylinder and adapted to force a strip of sheet metal into the interior thereof, said strip emerging from said cylinder in the form of a spiral with overlapped edges; rotating electrodes arranged to travel on said overlapping edges and be rotated by the movement of said strip and means for conveying an electric current to said electrode for the purpose of welding said overlapping edges together.

2. An apparatus for making sheet metal pipe comprising a stationary hollow cylinder; rollers arranged to force a strip of sheet metal into said cylinder at an angle to the axis thereof, the edges of the entering strip being arranged to overlap the edges of the portion of the strip previously forced into said cylinder; electrodes carried by said apparatus and arranged to contact with the exterior and interior surfaces of said overlapping edges, said electrodes being maintained in constant engagement with said strip substantially without friction thereon, and means for passing a current of electricity between said electrodes and through said overlapping edges for the purpose of welding same together.

3. An apparatus for making sheet metal pipe comprising a stationary cylinder having an opening in its side for the reception of said sheet metal, rollers for forcing a sheet metal strip through said opening, the interior surface of said cylinder acting to form said strip into a spiral with overlapping edges; an arm extending within said spiral, a metallic wheel carried by said arm and arranged to contact with said strip at the overlapping portion thereof, a second metallic wheel arranged to contact with said strip opposite the first wheel, and means for conducting electricity to said wheels for the purpose of welding said overlapping edges.

4. An apparatus for making sheet metal pipe comprising a stationary former, the interior surface of said former being cylindrical; rollers arranged at an angle to the axis of said cylinder and adapted to force a strip of sheet metal therein, said strip being formed into a closed spiral with overlapping edges by contact with the interior surface of said former and off-setting rollers arranged to off-set one edge of said strip before the latter enters said former so that said overlapping edges will form a projection on the exterior of said pipe, the interior surface being substantially continuous and smooth.

In testimony whereof, I affix my signature.

FRED L. WILLIAMS.